United States Patent [19]

McCann

[11] 4,238,959

[45] Dec. 16, 1980

[54] AUTOMOBILE SUSPENSION DYNAMIC SIMULATOR

[76] Inventor: John C. McCann, 4034 Agua Dulce Blvd., La Mesa, Calif. 92041

[21] Appl. No.: 12,232

[22] Filed: Feb. 14, 1979

[51] Int. Cl.³ .................... G01L 5/00; G01M 17/04
[52] U.S. Cl. ..................... 73/432 SD; 73/133 R; 187/8.41
[58] Field of Search ............... 73/432 SD, 117, 118, 73/133 R; 33/203.12; 187/8.41; 254/146

[56] References Cited

U.S. PATENT DOCUMENTS

| | | | |
|---|---|---|---|
| 1,436,766 | 11/1922 | Kendrick | 187/8.41 X |
| 1,889,735 | 11/1932 | Caldwell | 73/122 |
| 3,826,129 | 7/1974 | Wiss | 73/117 |
| 4,016,754 | 4/1977 | Wiss | 73/133 X |
| 4,133,201 | 1/1979 | Klinger | 73/432 SD X |

FOREIGN PATENT DOCUMENTS

2723232 5/1977 Fed. Rep. of Germany .......... 254/4 R
2221390 12/1974 France ..................................... 254/4 R

*Primary Examiner*—Daniel M. Yasich
*Attorney, Agent, or Firm*—Charles C. Logan, II

[57] ABSTRACT

An automobile suspension dynamic simulator having a base, tilting platform structure for supporting an automobile thereon, hinges along one lateral side of the tilting platform structure pivotally connecting it to the base, and structure for lifting the other lateral side of the tilting platform upwardly along an arcuate path. The lifting platform structure comprises a pair of laterally spaced tilting boards. A first pair of laterally spaced load measuring devices are mounted atop the front end tilting board for positioning beneath the front tires of an automobile. A second pair of laterally spaced load measuring devices are mounted atop the rear tilting board for positioning beneath the rear tires of an automobile. The simulator further includes a pair of tension spring scales to be attached to the center of gravity of the front end of the automobile and a pair of tension spring scales for attachment to the center of gravity of the rear end of the automobile. The respective ends of these tension spring scales are attached to the respective transverse base members so that they provide respectively a vertical load and a normal load on the centers of gravity of the front and rear ends of the automobile.

9 Claims, 2 Drawing Figures

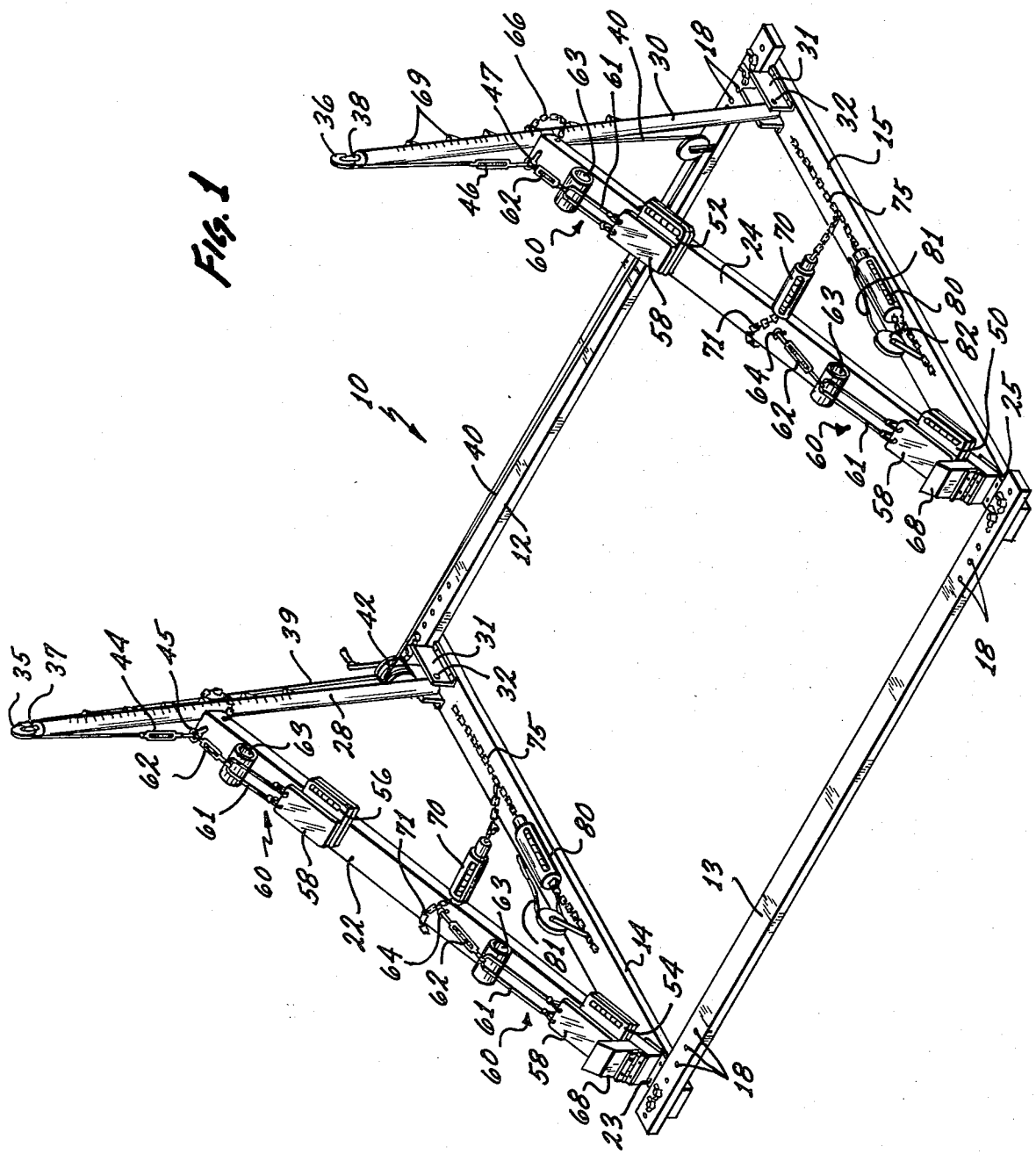

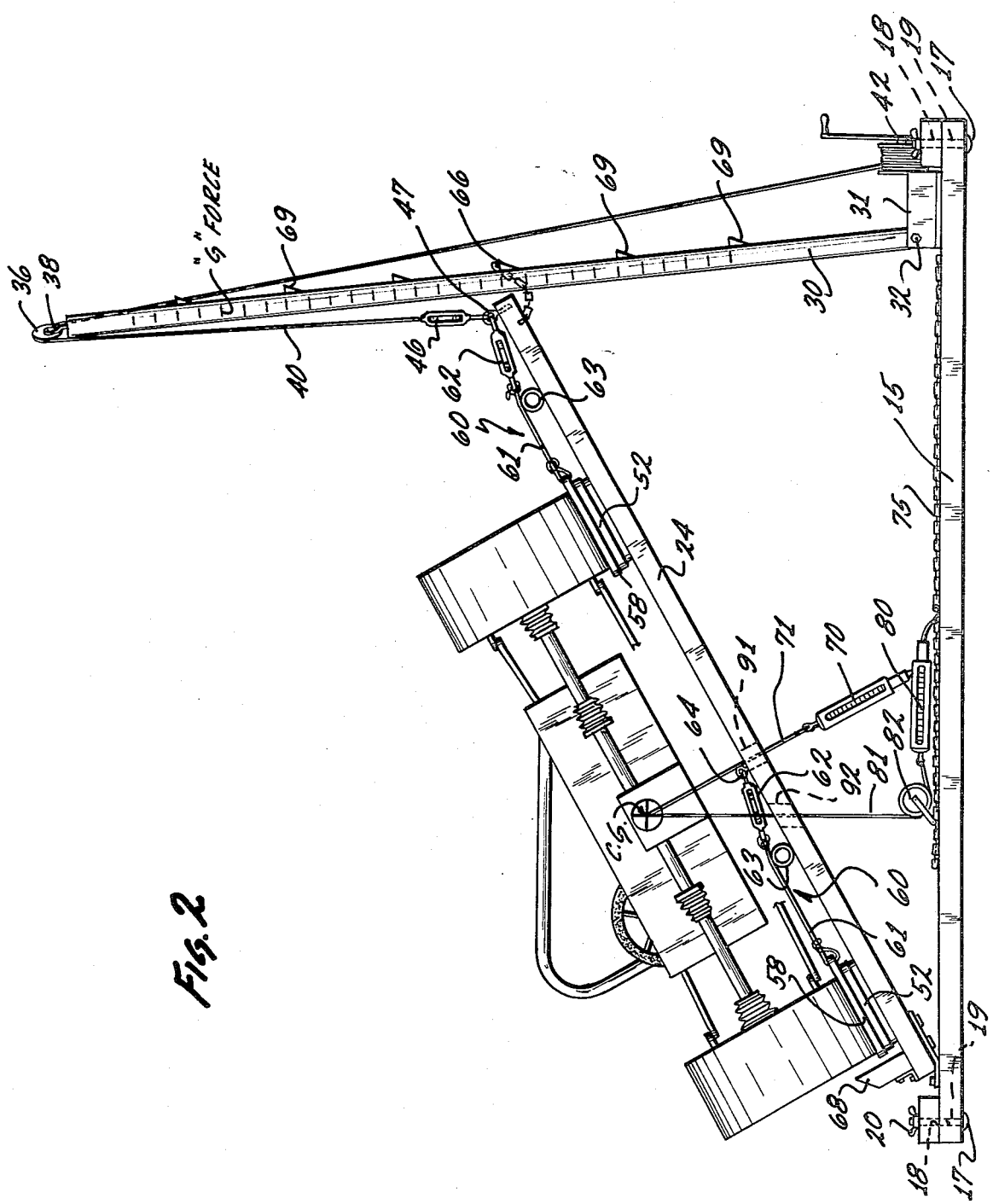

AUTOMOBILE SUSPENSION DYNAMIC SIMULATOR

BACKGROUND OF THE INVENTION

The invention relates to a device for statically observing, measuring, studying, and developing the suspension system of an automobile and its interrelationship with the automobile's chassis and the contact surface with which the suspension system is in contact. The invention is particularly useful for the development of racing cars but not limited thereto.

In the past different types of automobile lifts and racks have been developed for various purposes. One example of such an automobile lift is illustrated in U.S. Pat. No. 1,436,766. The purpose of this automobile lift was for permitting repairs, painting, oiling and the like to be performed.

Another form of an early automobile rack is illustrated in U.S. Pat. No. 1,521,450. The purpose of this rack was also to provide easier accessibility to the under side portion of the automobile. It additionally was easy to handle, durable, strong, and well adapted for the purpose for which it was designed.

In U.S. Pat. No. 1,889,735 an automobile ramp was designed as a brake testing machine. This provided the ability to test the brakes of the automobile in a controlled environment and not out on the street where an accident could result.

In U.S. Pat. No. 2,167,361 the automobile ramp has been designed for measuring and adjusting the front end alignment of the automobile.

Over the years since the development of the automobile, if a person wanted to study the suspension system of an automobile and its interrelationship with the automobile's chassis for purposes of making adjustments thereto, it was necessary to use expensive computers or to take the automobile out on the road or track to run tests thereon followed by periodic adjustments that would be made. A need has existed for years to provide an automobile suspension dynamic simulator which would allow for the duplication of the dynamics of cornering an automobile, when it is accelerating or braking without the necessity for taking the automobile out on the road or track.

It is an object of the invention to statically provide a means for observing, measuring, and developing the suspension system of an automobile and its interrelationship with the automobile's chassis and the contact surface with which the suspension system is in contact.

It is also an object of the invention to duplicate the dynamics of cornering an automobile in combination with braking or accelerating.

It is also an object of the invention to provide a novel automobile suspension dynamic simulator that can be used for fine tuning the suspension system of a racing car.

It is a further object of the invention to provide a novel automobile suspension dynamic simulator that is portable.

It is an additional object of the invention to provide a novel automobile suspension dynamic simulator that is economical to manufacture and market.

SUMMARY OF THE INVENTION

The novel automobile suspension dynamic simulator is designed to measure and adjust an automobile's suspension movements under different conditions of lateral "G" forces (i.e., cornering) and aerodynamic forces (i.e., vertical loads). By tilting the automobile laterally the effects of different side loads can be measured. Camber, toe-in, toe-out, weight transfer suspension jacking, and aerodynamic loads are all affected by tilting the automobile laterally. Additionally fuel, water and oil levels plus driver comfort can also be evaluated.

The novel automobile suspension dynamic simulator has a base, a tilting plane structure for supporting an automobile thereon, the tilting plane structure being hinged along one lateral side to pivotally connect to the base, and there is structure for lifting the other lateral side of the tilting plane structure upwardly along an arcuate path.

The base may take the form of a pair of laterally spaced longitudinal base members and a pair of longitudinally spaced transverse base members, with the ends of these base members being attached to each other to form a rectangular frame. In order to accommodate automobiles having different length wheelbases, the longitudinal dimensions of the rectangular frame formed can be adjusted.

The tilting plane structure may take the form of a pair of elongated tilting boards that are pivotally connected to the base at one of their ends and which are laterally spaced from each other. A first pair of laterally spaced load-measuring or weighing scale devices are mounted atop one of the tilting boards for positioning beneath the front tires of an automobile. A second pair of laterally spaced load-measuring or weighing scale devices are mounted atop the other tilting board for positioning beneath the rear tires of an automobile. Tire traction pads are mounted on the top of each of the weighing scales and these are attached to side load restraining assemblies for neutralizing any side loads on the traction pads. The loads on these weighing scales is directly readable in the same manner as a bathroom scale.

The manner in which the automobile suspension dynamic simulator is operated is to apply external forces to the center of gravity of the automobile, and in particular, to the centers of gravity between the front wheel center line and the rear wheel center line. That is, the center of gravity located between and in line with the front wheels and the rear wheels. Since the earth's gravity (1.0 G) acts vertically or normal to a horizontal surface or road and any side load (braking, acceleration, or cornering) acts horizontally or tangentially and at right angles to the normal or gravity force, by applying tangential, external forces through the automobile's rear and front centers of gravity and allowing the force of gravity to act in its usual vertical or normal sense, the automobile's chassis and suspension will assume the exact attitude as if it were cornering with a given centrifugal force. The most effective method of accomplishing this procedure is to tilt the automobile so that the ratio of the normal force into the tilting plane vs. the tangential force parallel to the tilting plane duplicates the gravitational loading (1.0 G) vs. the side loading "G" force. The formula would be $(F_N/F_L)=(V/A)$ where $F_N$=the weight of the car on the tilting platform; $F_L$=the lateral load on the tilting platform; V=the weight of the car on the road; and A=the lateral load on the car during actual cornering on the road. To make these forces, which are now in the correct relationship to each other also have the correct magnitude, a vertical force is applied by a tensioning device through the front and rear center of gravities. When the correct loads are applied to the automobile, the attitude of the automobile's chassis and suspension relative to the tilting plane is the same as that of the automobile on a road surface.

Aerodynamic forces that act on an automobile are simulated by applying external loads normal to the tilting plane. These loads may be applied by a tension or a compression device to simulate either down-force or up-lift.

A heavy duty, commercial tilting plane would be made of metal and would probably be bolted to a foundation or slab floor. The tension devices would be hydraulic or pneumatic cylinders using calibrated pressure gauges to indicate the load applied. The tilting plane would also be hydraulically or pneumatically operated.

DESCRIPTION OF THE DRAWINGS

FIG. 1 is a perspective view of the novel automobile suspension dynamic simulator; and FIG. 2 is a front end elevation view of the novel automobile suspension dynamic simulator.

DESCRIPTION OF THE PREFERRED EMBODIMENT

The novel automobile suspension dynamic simulator is generally designated numeral 10 and will be described by referring to FIGS. 1 and 2 of the drawings. The version of the invention illustrated is a light-weight, portable fixture. The base is comprised of a pair of laterally spaced longitudinal base members 12 and 13, and a pair of longitudinally spaced transverse base members 14 and 15. The ends of these base members are attached to each other by a plurality of bolts 17 that pass through aligned bore holes 18 and 19 of the respective base members and are locked in position by wing nuts 20. The longitudinal base members 12 and 13 have bore holes 18 spaced longitudinally adjacent to each of their ends so that the base can be adjusted to operate with automobiles having different wheelbase dimensions.

The tilting platform for supporting an automobile thereon is comprised of a pair of laterally spaced tilting boards 22 and 24 that have one of their ends pivotally attached to the transverse base members by hinges 23 and 25 respectively. The structure for lifting the free ends of the tilting boards upwardly along an arcuate path consists of a pair of lifting arms 28 and 30 that have their bottom ends pivotally attached to brackets 31 by pins 32. Pulleys 35 and 36 are attached to the tops of the respective lifting arms 28 and 30 by brackets 37 and 38. The manner of lifting the tilting boards in unison results from cables 39 and 40 being wound or unwound upon winch 42. Cable 39 passes upwardly around pulley 35 and has a turnbuckle 44 in series therewith that is attached to a hook 45 secured to the top surface of tilting board 22. Likewise cable 40 passes upwardly around pulley 36 and has a turnbuckle in series with it that is secured to a hook 47 attached to the top surface of tilting board 24. The turnbuckles 44 and 46 are provided to allow for unequal stretch in lifting cables 39 and 40 respectively. The lifting arms 28 and 30 are marked in "G" forces so that any "G" loading simulation can accurately be positioned without a separate angle calculation. Rather than expressing the marks on the lifting arms in degrees of angle, the marks indicate the the lateral "G" force having used the formula $\tan \alpha = (A/V)$, where $\alpha$ = the angle the platform makes with the base; $A$ = the lateral cornering force; and $V$ = the vehicle's weight.

A first pair of laterally spaced load-measuring devices 50 and 52 are mounted atop tilting board 24 for positioning beneath the front tires of an automobile. A second pair of laterally spaced load measuring devices 54 and 56 are mounted atop tilting board 22 for positioning beneath the rear tires of an automobile. The load measurements of 50, 52, 54, and 56 merely show how the weight of the car is distributed on the tilting platform boards. The load measurements on tensioning devices 70 are additional loads that would be applied to represent aerodynamic forces that would occur at different speeds which the car is traveling. Load measurements on tensioning devices 70 may also be applied to represent additional downward forces that would occur during braking. The load measurements on tensioning devices 80 would represent the additional amount of vertical downward force that needs to be applied to the car (in addition to the weight of the car itself-which is represented by the readings on scaled 50, 52, 54, and 56) to simulate the resultant vector force produced by the combination of the vertical downward weight of the car and the lateral side forces created during cornering. Traction pads 58 are mounted on top of each of the load measuring devices. These traction pads are made from a material having a high coefficient of friction with respect to rubber to prevent the tires from slipping down the tilting plane. To prevent any side load of the friction plates being transmitted to the load measuring devices and causing errors, side load restraint assemblies 60 are attached to the traction pads. The side load restraint assemblies consist of a cable 61 attached to the traction pad 58 and also turnbuckle 62. A shim 63 insures that the force applied against traction pad 58 is parallel to the top surface of the tilting board. The turnbuckle 62 is in turn secured to a hook 64 attached to the top surface of the tilting board.

When automobiles having a different width between the front wheels are tested, the load-measuring devices can be moved laterally inwardly or outwardly along the tilting board's top surface. Tire stops 68 provide a backup system for preventing the automobile from slipping off the tilting boards if the boards are tilted upwardly at too great an angle. A safety feature is also provided in case either cable 39 or 40 should snap or break. It consists of a plurality of saw-tooth lugs 69 that are welded or otherwise secured to the lifting arms 28 and 30 at vertically spaced intervals and a short length of chain 66 whose opposite ends are secured to the end of the tilt board. The chain passes around the lifting arm and as the tilting board is tilted upwardly, the chain will ride over the saw-tooth lugs. If the cable snaps, the chain will engage the top of the saw-tooth lug to prevent the tilting board from collapsing.

When the automobile has been tilted to the desired angle such as illustrated in FIG. 2, a tension spring scale 70 would be attached by a cable 71 to the center of gravity (e.g.) and drawn downwardly at an angle perpendicular or normal to the upper surface of the tilting board. The lower end of the tension spring scale would be attached by a hook at its bottom end to a short length of chain 75 that has been attached to the top surface of the transverse base member. Chain 75 extends across a great portion of the transverse base member's length to provide means for fastening the tension spring scale at multiple positions thereacross. This insures that the force being applied by the tension spring scale 70 can always be maintained normal to the tilting board surface.

Another tension spring scale 80 has its one end attached to a cable or chain 81 that is also secured to the center of gravity of the front end of the automobile. This cable passes downwardly from the center of gravity of the vehicle and is the vertical load force of the vehicle. Cable 81 passes around a pulley 82 and the position pulley 81 can be varied by attaching it to chain 75 at various locations along its length. Likewise the free end of tension spring scale 80 is also attached to chain 75 at its appropriate linkage depending on the desired load to be applied. Cables 71 and 81 respectively pass through bore slots 91 and 92 of the tilting boards.

What is claimed is:

1. An automobile suspension dynamic simulator comprising:
    a base;
    automobile support means having hinge means along one lateral side pivotally connecting it to said base; said automobile support means comprising first and second tilting platform boards, said boards having a first and a second end, one of said ends of each of said boards being connected to said hinge means;
    means for lifting the other lateral side of said automobile support means upwardly along an arcuate path;
    a first pair of load measuring devices mounted atop said automobile support means adjacent its front end for positioning beneath the front tires of an automobile;
    a second pair of laterally spaced load measuring devices mounted atop said automobile support means adjacent its rear end for positioning beneath the rear tires of an automobile;
    a first tension load force applying means having its one end attached to said base in the area substantially beneath said first pair of laterally spaced load measuring devices, the other end of said first tension load force applying means passing vertically upwardly through an aperture in said automobile support means for attachment to structure on the automobiles front end through which passes the automobiles front center of gravity; and
    a second tension load force applying means having its one end attached to said base in the area substantially beneath said second pair of laterally spaced load measuring devices, the other end of said second tension load force applying means passing vertically upwardly through an aperture in said automobile support means for attachment to structure on the automobile's rear end through which passes the automobile's rear axle center of gravity, whereby tilting the automobile laterally, side load effects on the automobile can be measured to evaluate dynamic conditions.

2. An automobile suspension dynamic simulator as recited in claim 1 further comprising traction pads mounted on the top of each of said load measuring devices.

3. An automobile suspension dynamic simulator as recited in claim 2 further comprising side load restraining means attached to each of said traction pads for neutralizing any side loads on the traction pads.

4. An automobile suspension dynamic simulator as recited in claim 3 wherein said side load restraining means each comprises a length of cable having one end secured to said traction pad, a shim positioned between the top surface of said support means and the bottom surface of said cable, a turnbuckle attached to the other end of said cable, and means for fastening said turnbuckle to the top of said support means.

5. An automobile suspension dynamic simulator as recited in claim 1 wherein said base comprises a pair of laterally spaced longitudinal base members and a pair of longitudinally spaced transverse base members, the ends of said base members being attached to each other to form a rectangular frame.

6. An automobile suspension dynamic simulator as recited in claim 1 wherein said automobile support means comprises a pair of elongated tilting boards that are pivotably connected to said base at one of their ends and which are laterally spaced from each other.

7. An automobile suspension dynamic simulator as recited in claim 6 wherein said base has means for varying the lateral spacing between said tilting boards depending upon the length of the wheel base of the automobile.

8. An automobile suspension dynamic simulator as recited in claim 1 wherein said means for lifting the other side of said automobile support means along an arcuate path comprises a pair of laterally spaced lifting arms each having their lower ends pivotally secured to said base, said lifting arms having a pulley mounted adjacent their upper ends, and cable means attached to the top of said automobile support means and passing around said pulleys with a winch connected to said cable means to raise and lower said automobile support means.

9. An automobile suspension dynamic simulator as recited in claim 1 further comprising:
    a third tension load force applying means having its one end attached to said base in the area substantially beneath said first pair of laterally spaced load measuring devices, the other end of said third tension load force applying means passing upwardly through an aperture in said automobile support means at an angle perpendicular to the upper surface of said automobile support means for attachment to structure on the automobile's front end through which passes the automobile's front axle center of gravity; and
    a fourth tension load force applying means having its one end attached to said base in the area substantially beneath said second pair of laterally spaced load measuring devices, the other end of said second tension load force applying means passing upwardly through an aperture in said automobile support means at an angle perpendicular to the upper surface of said automobile support means for attachment to structure on the automobile's rear end through which passes the automobile's rear axle center of gravity.

* * * * *